United States Patent Office 2,778,920
Patented Jan. 22, 1957

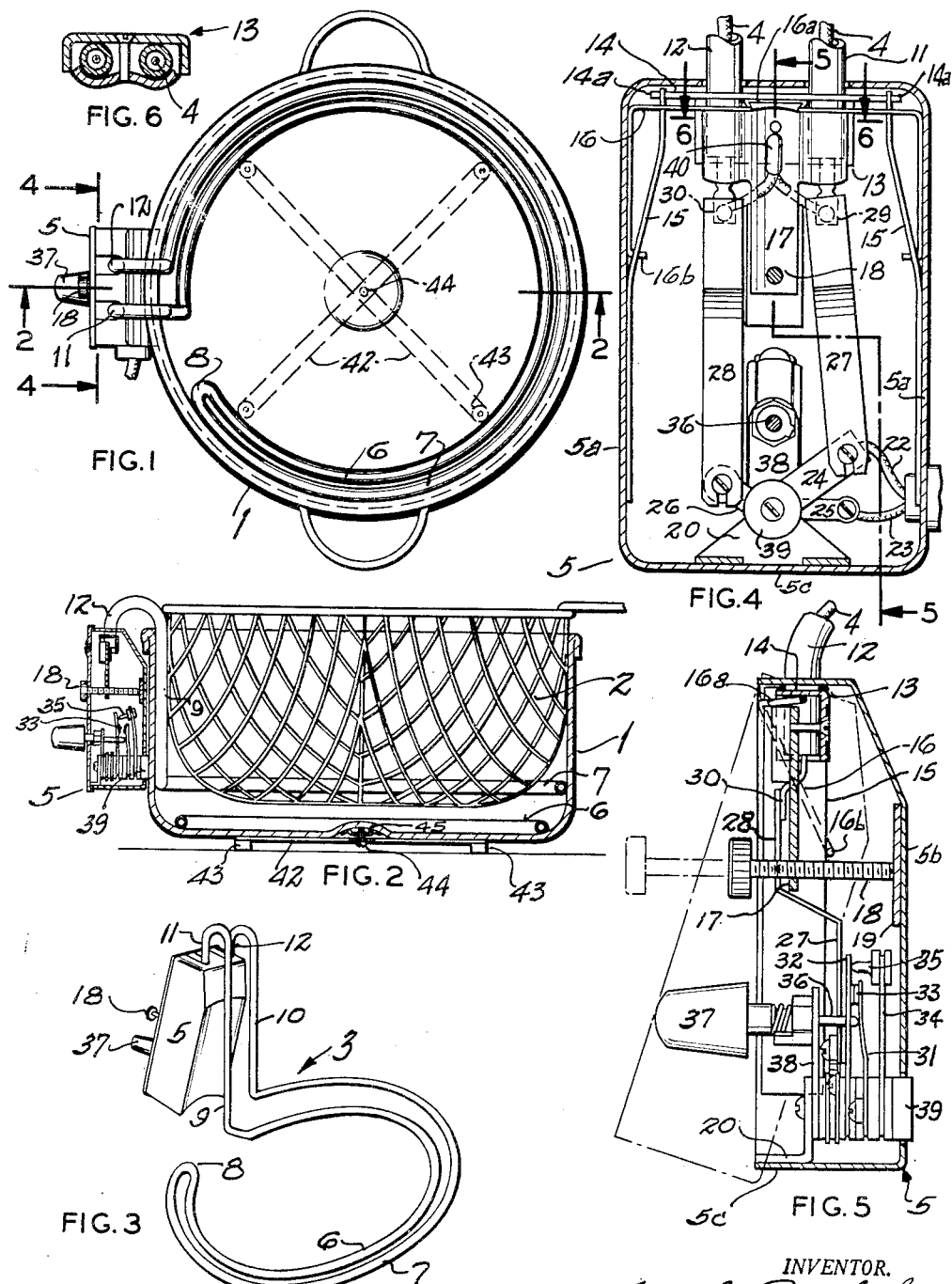

2,778,920
DEEP PAN COOKER
Joseph Pavelka, Jr., St. Louis, Mo.
Application March 11, 1953, Serial No. 341,690
9 Claims. (Cl. 219—43)

This invention relates to cooking apparatus and, more particularly, to deep well cookers and the like and to a heating unit adapted for ready application to and removal from a cooking vessel.

One object of this invention is to provide a cooking vessel with an electrically operated heating unit comprising a heating element in the lower part of the cooking vessel, and preferably disposed adjacent the inner face of the vessel side wall, and a thermostatic switch disposed exteriorly of and including a heat-conducting activating element contacting the vessel side wall to control the cooking temperature.

Another object is to provide a removable heating unit having a heating element adapted to substantially surround a food container within the cooking vessel, as in deep fat fryers, so that food particles and the like dropping from the container will fall direct to the bottom of the vessel and will not be deposited upon the heating element thereby allowing the element to remain cleaner than if it received the droppings.

Another object is to provide a removable heating unit for cookers having a thermostatic switch mounted upon a swingable member for adjustment toward and away from a rigid heating element and in adjustable clamp-forming relationship thereto whereby the wall of the cooking vessel may be firmly clamped between the thermostat and the heating element for holding the unit in operative position, and which relationship adapts the unit for use with vessels of varying wall and rim thickness.

Another object is to open the heater circuit automatically when the heater unit is removed from the cooking vessel and is laid upon a table or sink or the like.

Another object is to provide a heating unit of the type described which may be manufactured economically, which is reliable and durable in use, and which may be easily operated by the average housewife.

These and other detail objects are attained by the structure shown in the accompanying drawings, in which:

Figure 1 is a top view of a deep cooking vessel having a heating unit mounted thereon.

Figure 2 is a transverse vertical section taken on the line 2—2 of Figure 1 but also showing a food-containing basket disposed in the cooker.

Figure 3 is a perspective of the heating unit.

Figure 4 is a vertical detail section taken on the line 4—4 of Figure 1 and drawn to a larger scale.

Figure 5 is a vertical detail section taken on the line 5—5 of Figure 4.

Figure 6 is a detail horizontal section taken on the line 6—6 of Figure 4.

A cooking vessel 1 is a deep well frying container and receives an open mesh basket 2 for the food, such as potatoes, oysters, chicken and the like to be fried, preferably beneath the surface of the liquid cooking oil, etc. Removably clamped to the side wall of vessel 1 is an immersion heating unit shown in Figure 3, comprising a tubular member 3, enclosing an electric resistance element 4, and a box or casing 5 for enclosing a switch and thermostat. Tubular member 3 includes arcuate sections 6, 7, each forming an almost complete annulus and spaced one above the other (Figure 2). Upper section 7 is slightly larger in diameter than lower section 6. These sections merge at 8 at one end of their curvature and at the opposite end extend upwardly at 9 and 10, respectively, with their upper ends terminating in return bends 11 and 12, respectively.

A box support 13 and a cooperating plate 17 are clamped to the lower ends of return bends 11, 12 by a screw 5. The upper portion of one of the support walls is flanged horizontally at 14 and provided at its ends with pintles 14a, which are received in openings in the upper ends of flat springs 15 attached to the side walls 5a of casing 5 and thereby support the box so that it may be pivoted on clamp 13.

A U-shaped wire spring 16 is anchored at 16a between box 13 and plate 17 and extends forwardly of flat springs 15, and then downwardly with the lower ends of its legs 16b anchored behind springs 15. Spring 16 tends to thrust the box about pintles 14a from the full line position shown in Figure 5 to the broken line position. Plate 17 is threaded to receive a screw 18, the inner end of which bears against a plate 19 on the box rear wall 5b. Tightening of screw 18 moves the casing into position to clamp the vessel wall between the casing and the uprights 9, 10.

The unit may be described as of inverted U shape with one arm formed by elements 9, 10 and the other arm formed substantially by casing 5.

Obviously the unit may be applied to a substantial variety of cooking utensils but preferably is applied to a pan corresponding in depth and diameter to the dimensions of the unit so that arcuate sections 6, 7 are adjacent to the bottom and lower side of the pan, as shown in Figure 2, and they substantially surround the lower part of basket 2 so that food drippings therefrom will fall directly to the bottom of the vessel rather than be deposited on elements 6, 7 which will remain cleaner and with less impairment of their heat transferring qualities and there will be less likelihood of imparting undesired flavoring to foods subsequently cooked, either in the same fat, or in fresh fat, than if the heating elements underlie the basket and receive food deposits.

A bracket 20 on the lower wall 5c of box 5 mounts a current lead-in structure and control switch. Lead-in wires 22, 23 are secured to arms 24, 25, respectively, and arm 25 is continued at 26. Switch blades 27, 28 are mounted on arms 24, 26 and extend upwardly to oppose contacts 29, 30, respectively, on the lower ends of resistance elements 4. When spring 16 swings box 5 on clamp 13, relative to member 3, to the broken line position shown in Figure 5, blades 27, 28 swing away from terminals 29, 30, thus providing for opening the heater circuit except when screw 18 moves the blades and terminals to the position shown in full lines in Figure 5. Hence, when the user removes the unit from the pan and sets it on a table or other supporting surface, the heater circuit will open automatically, even though the user has not first disconnected the heater supply switch.

The circuit between arm 24 and arm 25, 26 is also controlled by switch blades 31, 32, both anchored to a suitable insulating post on bracket 20, both blades being flexible, and blade 31 being of spring material and distorted so that it tends to move to the left (Figure 5) to maintain contact of the buttons 33 near the upper ends of the blades. A bi-metal thermostat strip 34 is anchored on the bracket post and carries a porcelain tip 35 at its upper end, engaging switch blade 32. Strip 34 is constructed so that when heated its upper end will move to the left (Figure 2) separating buttons 33 since switch blade 31 is limited in its left hand movement about its contact with a finger 36 on the inner end of an adjusting handle 37. Finger 36 is threaded on upright 38 on bracket 20 and, when handle 37 is rotated in one direction, finger 36 is moved to the left. When handle 37 is rotated in the opposite direction, finger 36 is moved to the right. Accordingly, there is a combined manual and thermostatic control of the heater circuit. In thermo contact with the lower end of thermostat switch 34 is a button 39 which projects through an opening in the box rear wall 5b so as to contact the upright wall of the pan.

Irrespective of the depth of the vessel to which the heating unit is applied, and irrespective of the thickness of its side wall, or of the type of rim at the upper end of the side wall, the thermostat heat conducting element will be in contact with the exterior of the side wall near the bottom of the vessel and directly opposite to the major portions 6, 7 of the heater. Accordingly, the thermostat element of the switch will be subject to a temperature very close to the temperature of the liquid in the vessel, rather than to the temperature of a heater exteriorly of the vessel, as in some cookers, which may not have a close relation to the temperature of the liquid in which the food is being cooked. This provides for accurate control of the temperature of the oil or other liquid in the vessel.

Preferably the circuit includes an indicating light 40 visually signalling the user that the circuit is closed.

By providing the cooker pan 1 with a skeleton base 42 of low thermal characteristics and having feet 43, the cooking operation may be conducted on a dining table or other finished surface without scorching such surface. The base is detachably connected to the pan by a screw 44 engaging a clip 45 on the pan bottom.

The details of the construction may be varied without departing from the spirit of the invention and the exclusive use of those modifications coming within the scope of the claims is contemplated.

What is claimed is:

1. A heating unit for removable mounting upon a circular cooking vessel comprising an electrical resistance heating element for disposition within the vessel and having an upright portion with an annular portion at the lower end of said upright portion of sufficient radius for positioning adjacent the side wall of the vessel, there being a horizontal extension at the upper end of said upright portion, a heat-responsive switch connected with but spaced below said horizontal extension for disposition exteriorly of the vessel in contact with the outer face of its side wall opposite the upright portions of said element, a carrier plate supporting said switch and hinged to said horizontal extension, and means for positively moving said carrier plate toward and away from the upright portion of said element to clamp an intervening vessel part between them.

2. A heating unit for removable application to a cocking vessel comprising an inverted U-shaped tubular member with one downwardly extending portion of substantial length and terminating in a horizontally disposed arcuate section, said member having another relatively short downwardly extending portion, a casing movably carried by said latter-mentioned portion and extending downwardly therefrom and spaced horizontally from said arcuate section, a heating element with an end extending throughout said tubular member and projecting from the relatively short portion thereof, electric conductors including lead-in wire terminals on said casing, and switch members associated with the end of said heating element, manually operable device on said casing for positively moving said casing towards said section, and spring means associated with said member and casing for thrusting said casing away from said section when said manually operable device is released.

3. In an electric heating unit for application to the side of a cooking vessel, an inverted U-shaped structure comprising a casing forming one arm of the U-shaped structure and an electric resistance heating element leading therefrom and enclosed by a tubular member forming the other arm of the U-shaped structure, there being an electric circuit for said element, a switch having a blade in said casing and movable therewith, a manually operable device for positively moving the casing arm toward the tubular member arm to engage opposite sides of a vessel wall between the arms and to close said switch, and spring means thrusting said casing arm in the opposite direction to open said switch when said device is released from manual control.

4. An electric heating unit as described in claim 3 which includes a thermostatic switch, in addition to the manually operable switch, for controlling the electric heating element circuit.

5. An electric heating unit as described in claim 3 in which the lower end of the tubular member arm merges with an arcuate extension disposed horizontally and disposed to support the unit upon a flat surface with the casing arm spaced above the supporting surface.

6. In a heating unit for application to the upright side of a cooking vessel, an elongated electrical resistance heating structure including an upright part, a casing movably assembled with the upper portion of said upright part and spaced from the remainder of said upright part, spring means thrusting the lower portion of said casing away from said upright part, and a manually operable device carried by said casing for moving said casing towards said upright part against the thrust of said spring.

7. A heating unit as described in claim 6 which includes a switch in said casing controlling the current for the heating structure and including contacts opposing contacts on the structure and movable with the casing, and a thermostatic switch controlling said circuit irrespective of the relative position of said casing and the upright part of the elongated heating structure.

8. An immersion heating unit for application to the upright wall of a cooking vessel including a substantially rigid upright heating element, and a switch and thermostat housing opposed to said upright heating element, there being a substantially rigid support structure fixed to the upper end of said heating element, said housing being pivotally suspended from said support structure, and a member associated with said support structure and having a part projecting therefrom for manual operation and a part engageable with said box to positively move it towards said upright heating element to form a clamp.

9. A unit as described in claim 8 which includes a thermostat within the housing and a heat-conducting contact member associated with said housing and yieldingly projected through an opening therein opposite to said heating element.

References Cited in the file of this patent

UNITED STATES PATENTS

| 1,570,507 | Lightfoot | Jan. 19, 1926 |
| 1,994,909 | Ehrgott | Mar. 19, 1935 |
| 2,278,994 | Kempton | Apr. 7, 1942 |
| 2,576,688 | Landgraf | Nov. 27, 1951 |